US00RE50458E

(19) United States
(12) Reissued Patent
Boire

(10) Patent Number: US RE50,458 E
(45) Date of Reissued Patent: Jun. 17, 2025

(54) ADJUSTABLE RETURN ROLLER BRACKET FOR TRACKING CONVEYOR BELTS

(71) Applicant: Precision, Inc.

(72) Inventor: Steven Armand Boire, Uxbridge (CA)

(73) Assignee: Precision, Inc., Pella, IA (US)

(21) Appl. No.: 18/451,303

(22) Filed: Aug. 17, 2023

Related U.S. Patent Documents

Reissue of:
(64) Patent No.: 11,332,320
Issued: May 17, 2022
Appl. No.: 16/871,496
Filed: May 11, 2020

(51) Int. Cl.
*B65G 39/12* (2006.01)
*B65G 15/60* (2006.01)

(52) U.S. Cl.
CPC ..... *B65G 39/12* (2013.01); *B65G 15/60* (2013.01); *B65G 2207/30* (2013.01)

(58) Field of Classification Search
CPC ..... B65G 39/12; B65G 15/60; B65G 2207/30
See application file for complete search history.

(56) References Cited

U.S. PATENT DOCUMENTS 2,593,089 A * 4/1952 Barry ..... B65G 13/11 193/35 R
4,486,056 A * 12/1984 Brandenstein ..... F16C 13/022 384/546
4,775,355 A * 10/1988 Mizukoshi ..... F16D 3/205 464/111
5,332,083 A * 7/1994 Axmann ..... B65G 15/02 198/831
7,614,493 B2 * 11/2009 Dowling ..... B65G 39/16 198/837
9,884,730 B2 * 2/2018 DeVries ..... B65G 39/071
10,836,581 B2 * 11/2020 DeGroot ..... B65G 21/06
2006/0076217 A1 * 4/2006 Cumberlege ..... B65G 39/16 198/806
2006/0108201 A1 * 5/2006 Swinderman ..... B65G 45/16 198/499
2009/0260956 A1 * 10/2009 Dunn ..... B65G 39/16 198/825
2011/0272250 A1 * 11/2011 DeVries ..... B65G 39/16 198/806
2013/0284565 A1 * 10/2013 Kuiper ..... B65G 39/16 198/806
2016/0304290 A1 * 10/2016 Reischl ..... B65G 39/12
2022/0411192 A1 * 12/2022 Sadasivan ..... B65G 13/11

FOREIGN PATENT DOCUMENTS

EP 0498673 A1 * 12/1992
JP 04358607 A * 12/1992

* cited by examiner

*Primary Examiner* — Laura Davison
(74) *Attorney, Agent, or Firm* — Armstrong Teasdale LLP

(57) ABSTRACT

In a preferred embodiment, there is provided an adjustable roller bracket assembly for a belt conveyor system, and which comprises a first end portion, a second end portion, and an adjustment mechanism connecting the first and second end portions, the first end portion being for attachment to a system frame, the second end portion being for rotatably engaging a roller at an axial end thereof, and the adjustment mechanism being operable to permit selective movement of the second end portion relative to the first end portion against frictional resistance therebetween to effect adjustment of a rotational axis of the roller.

19 Claims, 11 Drawing Sheets

ADJUSTABLE RETURN ROLLER BRACKET FOR TRACKING CONVEYOR BELTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATIONS*

*This application is a reissue application of U.S. Pat. No. 11,332,320, issued May 17, 2022, which was filed May 11, 2020 as U.S. patent application Ser. No. 16/871,496.*

SCOPE OF THE INVENTION

The present invention relates to an adjustable roller bracket assembly for tracking a conveyor belt forming part of a belt conveyor system, and which are provided with first and second end portions and an adjustment mechanism connecting the first and second end portions.

BACKGROUND OF THE INVENTION

A belt conveyor system is a type of conveyor systems designed to move an object from one location to another location. At a simpler level, a belt conveyor system may include a frame, a pair of pulleys rotatably coupled to the frame at opposed frame ends and an endless loop of a conveyor belt disposed between and over the pulleys, where one or both of the pulleys are drive pulleys for moving the conveyor belt. In this configuration, the conveyor belt traverses from a first one of the pulleys to a second pulley (above the pulleys) in a conveying direction, over an outer periphery of the second pulley, traverses in a return direction opposite to the conveying direction to the first pulley (below the pulleys), over an outer periphery of the first pulley, and so on. Such movement of the conveyor belt permits a material to be loaded onto the conveyor belt near the first pulley and conveyed in the conveying direction, and unloaded near the second pulley.

U.S. Pat. No. 6,758,323 to Costanzo provides a non-limiting example of a belt conveyor system in FIG. 1 of Costanzo, FIG. 1 of Costanzo shows a conveyor 20 having a first conveyor mat 22 supported in a conveyor frame, where the first conveyor mat 22 is shown as an endless conveyor belt looped around pulleys or sprocket sets 24 mounted on shafts rotatably supported in bearing blocks 28 attached to a conveyor frame. FIG. 1 of Costanzo shows a motor 30 coupled to the shaft at one end to one of the first and second pulleys 24 to drive the conveyor in the conveying direction indicated by arrow 32.

The belt conveyor system may further include a number of rollers disposed between the first and second pulleys and below the conveyor belt in rolling contact therewith, in order to support the weight, impact and movement of the conveyor belt thereon, as well as the material placed on the conveyor belt being conveyed to the second pulley. Typically, the rollers are idle rollers that are not powered to drive or assist driving the conveyor belt, but rather passively rotates with movement of the conveyor belt. Each of the rollers may be rotatably mounted to the frame with a pair of roller brackets attached to the frame at opposed axial ends of the roller to rotatably retain the roller therebetween. The rollers may be disposed under the conveyor belt moving in the conveying direction, in which case the rollers may be referred as carrying rollers, or under the conveyor belt moving in the return direction, in which case the rollers may be referred as return rollers.

During operation of the belt conveyor system, the conveyor belt may move laterally off the normal direction of travel in the endless loop, and become misaligned with the pulleys and the rollers. If left uncorrected, the conveyor belt may possibly run off the pulleys and the rollers, and negatively affect operation of the belt conveyor system.

SUMMARY OF THE INVENTION

One possible non-limiting object of the present invention to provide an adjustable roller bracket assembly for use with a belt conveyor system, and which permits for tracking a conveyor belt with a view to correct for any lateral movement of the conveyor belt perpendicular to the direction of travel in the endless loop.

Another possible non-limiting object of the present invention is to provide an adjustable roller bracket assembly for use with a belt conveyor system, and which may permit for tracking a conveyor belt without necessarily requiring operation of the belt conveyor system to pause or stop during tracking.

Another possible non-limiting object of the present invention is to provide an adjustable roller bracket assembly for use with a belt conveyor system, and which permits for simpler operation for tacking a conveyor belt with reduced moving parts, complexity or maintenance of the involved components.

Another possible non-limiting object of the present invention is to provide an adjustable roller bracket assembly for use with a belt conveyor system, and which permits manual tracking of a conveyor belt at a safer distance while the conveyor belt continues to move.

In one aspect, the present invention provides an adjustable roller bracket assembly for a belt conveyor system, the belt conveyor system comprising a frame, a conveyor belt, a roller in rolling contact with the conveyor belt, and first and second pulleys rotatably coupled to the frame, wherein one or both said first and second pulleys are operable to drive the conveyor belt between and around the pulleys in an endless loop, and the bracket assembly comprising a first end portion, a second end portion, and an adjustment mechanism connecting the first and second end portions, the first end portion being for attachment to the frame, the second end portion being for rotatably engaging the roller at an axial end thereof, and the adjustment mechanism being operable to permit selective movement of the second end portion relative to the first end portion against frictional resistance therebetween to effect adjustment of a rotational axis of the roller.

In another aspect, the present invention provides a belt conveyor system comprising a frame, a conveyor belt, a roller in rolling contact with the conveyor belt, and first and second pulleys rotatably coupled to the frame, wherein one or both said first and second pulleys are operable to drive the conveyor belt between and around the pulleys in an endless loop, whereby the conveyor belt moves in a conveying direction from the first pulley to the second pulley, around the second pulley, in a return direction to the first pulley, and around the first pulley, the roller being a return roller positioned under the conveyor belt in rolling contact therewith in the return direction, wherein the system further comprises an adjustable roller bracket assembly comprising a first end portion, a second end portion, and an adjustment mechanism connecting the first and second end portions, the first end portion being for attachment to the frame, the second end portion being for rotatably engaging the return roller at an axial end thereof, and the adjustment mechanism being operable to permit selective movement of the second end portion relative to the first end portion against frictional resistance therebetween to effect adjustment of a rotational axis of the roller, and wherein the adjustment mechanism comprises a coupling member for movably coupling the first and second end portions, and a locking member operable to selectively permit or prevent the movement of the second end portion relative to the first end portion, wherein at least one of the coupling member and the locking member provides the frictional resistance between the first and second end portions.

In one embodiment, in the endless loop, the conveyor belt moves in a conveying direction from the first pulley to the second pulley, around the second pulley, in a return direction to the first pulley, and around the first pulley, wherein the roller is a return roller positioned under the conveyor belt in the rolling contact therewith in the return direction. In an alternative embodiment, the roller is a carrying roller positioned under the conveyor belt in the rolling contact therewith in the conveying direction.

It is to be appreciated that the frictional resistance between the first and second end portions or the frame attachment and roller engagement plates against their relative movement does not necessarily require or involve direct physical contact therebetween, and may be effected by or through additional components of the system, such as the adjustment mechanism connecting the first and second end portions.

In one embodiment, the adjustment mechanism comprises a coupling member for movably coupling the first and second end portions, and a locking member operable to selectively permit or prevent the movement of the second end portion relative to the first end portion, wherein at least one of the coupling member and the locking member provides the frictional resistance between the first and second end portions.

In one embodiment, the first end portion comprises a frame attachment plate, the second end portion comprises a roller engagement plate, and the coupling member comprises a coupling rod movably connecting or received through said plates to permit pivoting movement of the roller engagement plate relative to the frame attachment plate. In one embodiment, the coupling rod is coupled to one said plate, and is received through the other said plate. In one embodiment, the coupling rod is received through both said plates.

In one embodiment, the locking member comprise a locking rod coupled to the roller engagement plate, and the frame attachment plate defines a receiving slot shaped to receive the locking rod therethrough along the pivoting movement of the roller engagement plate relative to the frame attachment plate, wherein the locking rod is operable to selectively hold the frame attachment plate relative to the roller engagement plate at a desired position.

In one embodiment, the receiving slot is a substantially arcuate receiving slot. It is to be appreciated, however, that the receiving slot is not strictly required to have an arcuate shape. In an alternative embodiment, the receiving slot is a substantially linear receiving slot, and the locking rod is movably coupled to the roller engagement plate, whereby the locking rod is movable along a direction substantially normal to a length of the substantially linear receiving slot, thereby permitting the locking rod to remain received in the linear slot along the pivoting movement of the roller engagement plate relative to the frame attachment plate.

In one embodiment, the receiving slot is sized to permit maximum pivoting movement of the roller engagement plate relative to the frame attachment plate between about 10° and about 120°, preferably between about 30° and about 90°, or more preferably about 60°. Preferably, when the locking rod is positioned at a slot center of the receiving slot, i.e., the roller engagement plate is not pivoted relative to the frame attachment plate, the roller is vertically positioned with the bracket assembly, such that the roller is urged upwardly to the conveyor belt, thereby when the roller engagement plate is subsequently pivoted relative to the frame attachment plate, the rolling contact between the roller and the conveyor belt is maintained.

In one embodiment, the locking rod comprises an externally threaded portion and a locking nut having an internally threaded portion for complementary threaded engagement with the externally threaded portion, wherein the locking nut is selectively movable in the threaded engagement to press against the frame attachment plate around a periphery of the receiving slot, thereby providing at least a portion of the frictional resistance between said two plates during the pivoting movement of the roller engagement plate relative to the frame attachment plate or preventing the pivoting movement at the desired position.

It is to be appreciated that the locking nut may operate to provide at least a portion of the frictional resistance between the two plates, by for example, maintaining contact between the locking nut and the frame attachment plate with sufficient friction force to resist the pivoting movement of the roller engagement plate relative to the frame attachment plate, and which is less than the friction force required to prevent the pivoting movement entirely.

In one embodiment, the frame attachment plate and the roller engagement plate are positioned such that a plane of the frame attachment plate faces or is generally parallel to a plane of the roller engagement plate. In one embodiment, the locking nut is for positioning adjacent to the other plane of the frame attachment plate opposed to the plane facing the roller engagement plate. In one embodiment, the locking nut is selectively movable in the threaded engagement to press against the frame attachment plate towards the roller engagement plate around the periphery of the receiving slot.

In one embodiment, the frame attachment plate comprises a sloping portion around the periphery of the receiving slot with an increasing slope height from a slot center to each longitudinal end of the receiving slot, thereby providing an increasing amount of the frictional resistance against the pivoting movement of the roller engagement plate relative to the frame attachment plate through the locking nut, with the locking rod and the locking nut moving towards the longitudinal end. The sloping portion is preferably disposed on a plane of the frame attachment plate which contacts the locking nut, such that when the locking nut is moved from the slot center to either longitudinal end of the slot, the locking nut is more pressed against the frame attachment plate with the increasing slope height, thus providing for greater frictional resistance.

In one embodiment, the locking rod and the receiving slot are located above the coupling rod. In one embodiment, the locking rod and the coupling rod are separated by a distance between about 0.5 inch and about 8 inches or preferably between about 1 inch and about 5 inches.

In one embodiment, the locking rod is resiliently biased upwardly, and the frame attachment plate further defines a plurality of notches along an upper periphery of the receiving slot, each said notches being sized to removably receive the locking rod therein with the resilient bias, thereby permitting the pivoting movement of the roller engagement plate relative to the frame attachment plate incrementally between adjacent said notches.

In one embodiment, the assembly further comprises a roller pin coupled to the roller engagement plate for the rotatable engagement of the roller thereto at the axial end, the roller pin being positioned above the locking rod and the receiving slot.

In an alternative embodiment, the locking rod and the receiving slot are located below the coupling rod, and the roller pin is positioned above the coupling rod. In the alternative embodiment, the locking rod is resiliently biased downwardly, and the frame attachment plate further defines a plurality of notches along a lower periphery of the receiving slot, each said notches being sized to removably receive the locking rod therein with the resilient bias, thereby permitting the pivoting movement of the roller engagement plate relative to the frame attachment plate incrementally between adjacent said notches.

In one embodiment, the coupling rod is fixedly attached to the roller engagement plate, the coupling rod comprising an externally threaded portion and a pair of holding nuts each having an internally threaded portion for complementary threaded engagement with the externally threaded portion of the coupling rod, wherein the frame attachment plate is frictionally held between the holding nuts, thereby providing at least a portion of the frictional resistance between said two plates. Preferably, the coupling rod is received through the frame attachment plate, with the frame attachment plate preferably defining an aperture for receiving the coupling rod therethrough, and the holding nuts are located adjacent to the aperture.

In one embodiment, the adjustment mechanism further comprises a pair of washers, each said washer being disposed between the frame attachment plate and an associated one of the holding nuts, whereby the washers are in frictional engagement with the frame attachment plate to provide at least a portion of the frictional resistance between the frame attachment plate and the roller engagement plate, and preferably, wherein the holding nuts are welded to the externally threaded portion of the coupling rod.

Alternatively, one of the holding nuts may be replaced with an enlarged diameter portion integrally formed on the coupling rod, whereby the frame attachment plate is frictionally held between one said holding nut and the enlarged diameter portion, with the enlarged diameter portion disposed between the frame attachment plate and the roller engagement plate.

In one embodiment, the coupling rod is fixedly attached to the roller engagement plate, and the frame attachment plate comprises a receiving barrel oriented substantially normal to a plane of the frame attachment plate, wherein the coupling rod is received through the receiving barrel in an interference fit, thereby providing at least a portion of the frictional resistance between said two plates. In this embodiment, to prevent axial movement of the receiving barrel, and thus, the frame attachment plate along a length of the coupling rod, the coupling rod may include a reduced diameter portion, and the reduced diameter portion is received in the receiving barrel in the interference fit.

In an alternative embodiment, the coupling rod is fixedly attached to the frame attachment plate, and the roller engagement plate comprises the receiving barrel.

In one embodiment, the receiving barrel may be frictionally held the holding nuts, optionally with the washers in the frictional engagement with the receiving barrel.

It is to be appreciated that the coupling rod and the locking rod described herein may be substituted with other elongate structure, provided that the elongate structure operates to perform the functions of the coupling or locking rod. In one embodiment, the coupling rod may be a coupling bolt, or the locking rod may be a locking bolt, where the bolt preferably comprises a bolt head and a shank portion extending from the bolt head. In that embodiment, the externally threaded portion may be provided on the shank portion or as an externally threaded shank portion.

In one embodiment, the roller has a length between about 1 foot and about 10 foot, preferably between about 2 foot and about 6 foot, or more preferably between about 3 foot and 4 foot. In one embodiment, the roller has a diameter between about 1 inch and about 1 foot, preferably between about 2 inches and 6 inches, or more preferably about 4 inches.

It is to be appreciated that the roller, the return roller or the carrying roller may be of generally cylindrical shape to be rotatably retained or engaged between a pair of opposed roller brackets or roller bracket assemblies, where each said bracket or bracket assembly is disposed at an associated axial end of the roller. Preferably one of the bracket assemblies is the adjustable roller bracket assembly of the present invention, with the remaining one of the bracket assemblies being that known in the art or which is not adjustable. The applicant has appreciated that with movement of the second end portion relative to the first end portion as described herein, the rotational axis of the roller may be adjusted as needed without necessarily requiring the other bracket assembly to be also adjustable.

It has been appreciated that during normal operation of the belt conveyor system, the conveyor belt may move laterally (i.e., normal to a moving direction of the conveyor belt in the endless loop) towards an axial end of the roller, thus requiring realignment or tracking of the conveyor belt to prevent system failure or damage. It has also been appreciated that if, for example, the conveyor belt has moved laterally towards a first axial end of the roller, the rotational axis of the roller may be adjusted with the selective movement of the second end portion relative to the first end portion, such that the first axial end contacts the conveyor belt in the moving direction before the opposite second axial end. The applicant has appreciated that the adjustable roller bracket assembly may advantageously permit operation to track the conveyor belt without necessarily ceasing operation of the belt conveyor system while the conveyor belt is moving in the endless loop, and at a safe distance from the conveyor belt while visually inspecting alignment.

Additional and alternative features of the present invention will be apparent to a person skilled in the art from the following detailed description of the preferred embodiments thereof.

BRIEF DESCRIPTION OF THE DRAWINGS

Reference may now be had to the following detailed description taken together with the accompanying drawings in which.

DETAILED DESCRIPTION OF THE PREFERRED EMBODIMENTS

Figure 1:
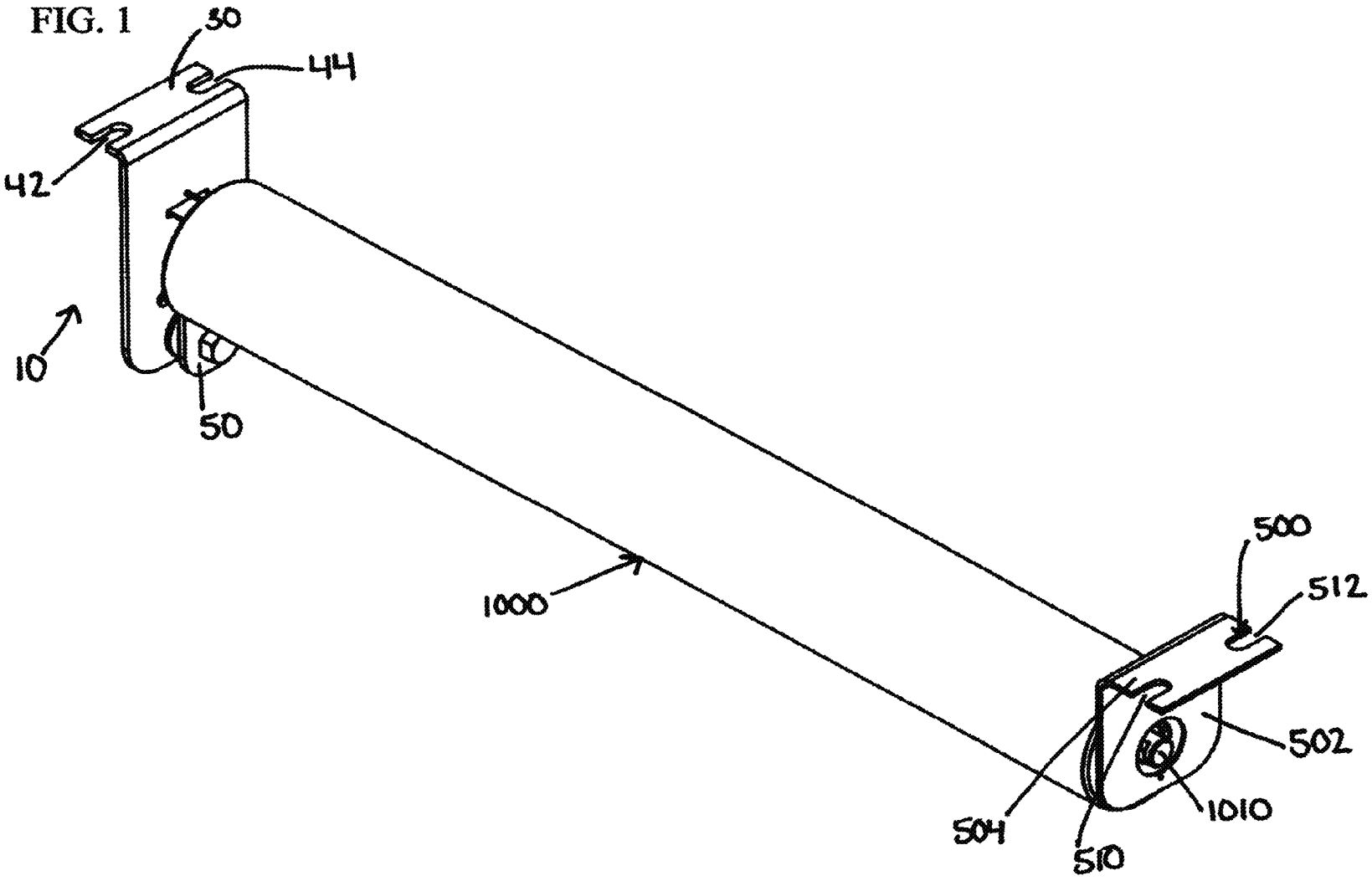
FIG. 1 is a perspective view of an adjustable roller bracket assembly in accordance with a preferred embodiment of the present invention, and which is shown in an operating position with a return roller and a nonadjustable roller bracket assembly.

Reference is made to FIG. 1 which shows a perspective view of an adjustable return roller bracket assembly 10 in an operable position with a nonadjustable return roller bracket assembly 500 to rotatably engage a return roller 1000 included with a belt conveyor system (not shown) *such as in a belt conveyor system having a frame, a conveyor belt with the roller being in rolling contact with the conveyor belt, and first and second pulleys rotatably coupled to the frame, wherein one or both said first and second pulleys are operable to drive the conveyor belt between and around the pulleys in an endless loop.* In the construction shown, and as will be further described below, the bracket assembly 10 broadly includes a *first end portion having a* frame attachment plate 30, *a second end portion having* a roller engagement plate 50, *and an adjustment mechanism comprising a coupling member* (*e.g.,* a coupling bolt 70) and *a locking members* (*e.g.,* a retention or locking bolt 90).

Figure 2:
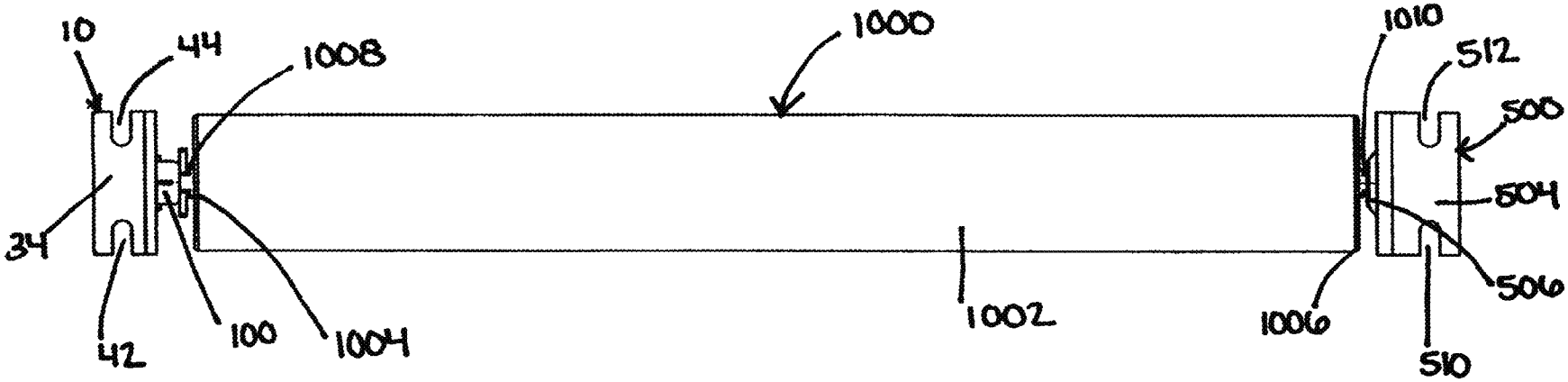
FIG. 2 is a top view of the roller bracket assemblies and the return roller shown in FIG. 1.
Figure 3:
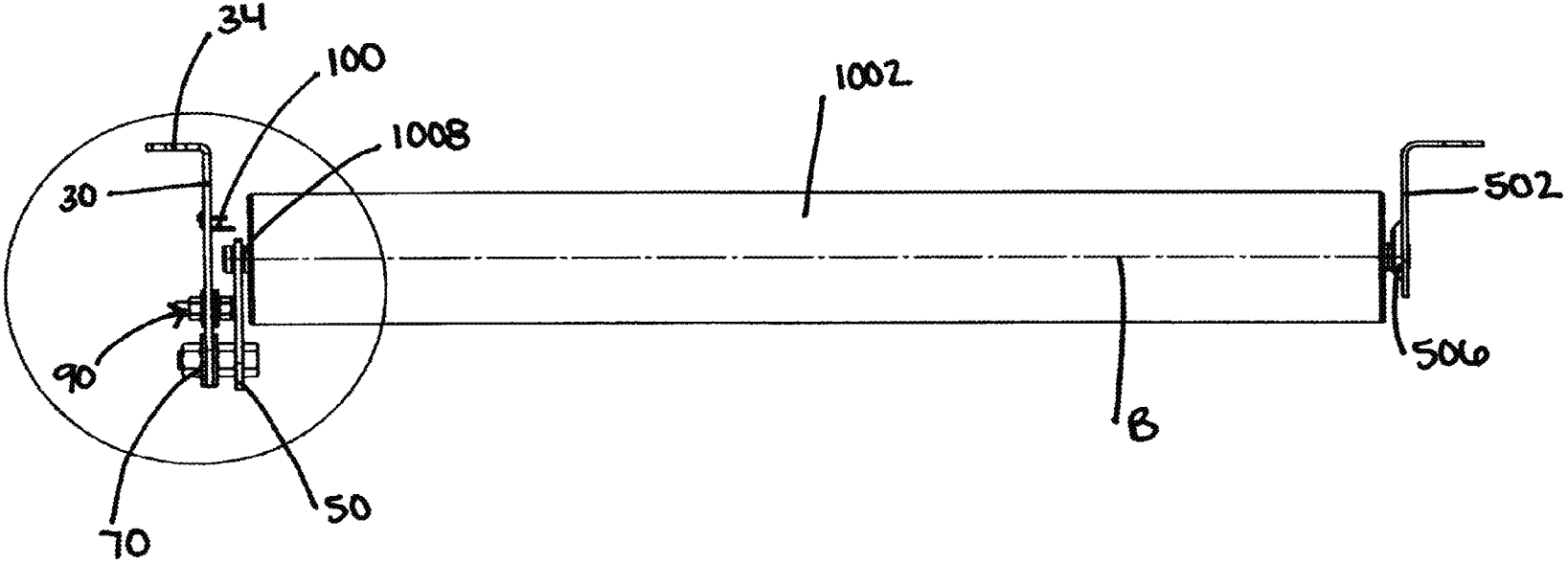
FIG. 3 is a front view of the roller bracket assemblies and the return roller shown in FIG. 1.
Figure 4:
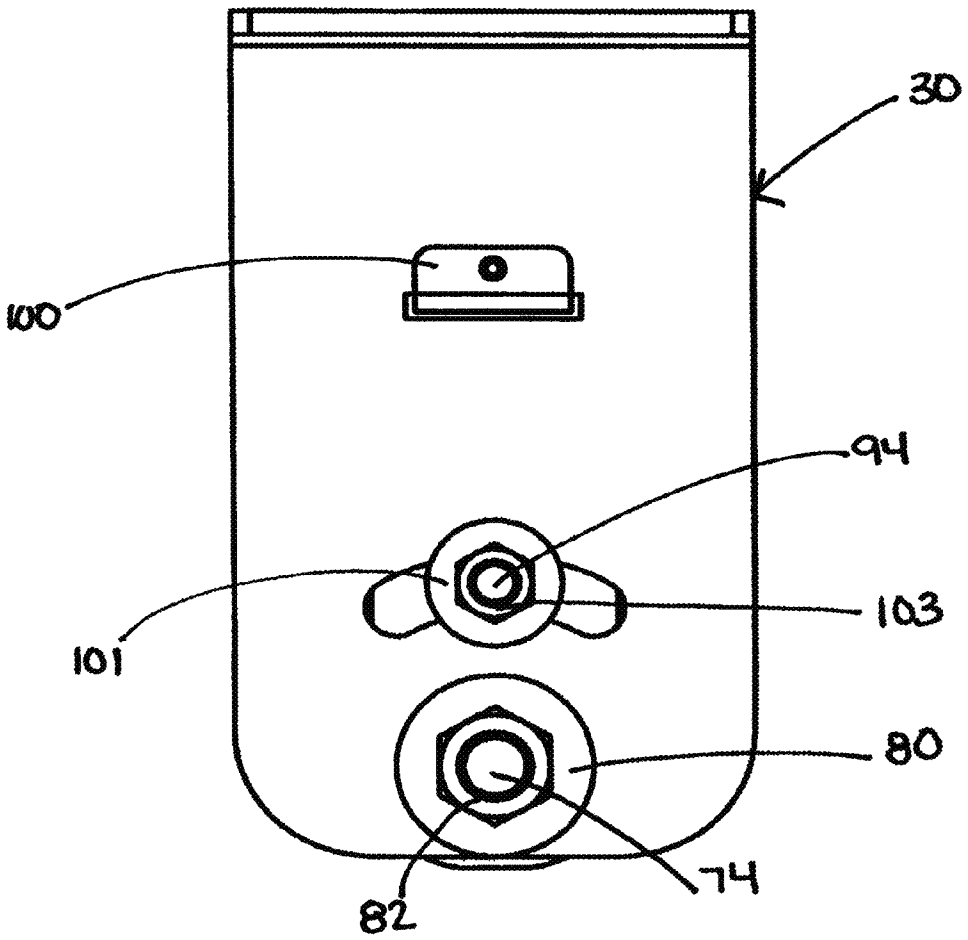
FIG. 4 is a lateral view of the roller bracket assemblies and the return roller shown in FIG. 1 when viewed facing the adjustable roller bracket assembly.

As best seen in FIGS. 2 and 3, the return roller 1000 includes an elongate cylindrical body 1002 having a pair of opposed axial ends 1004, 1006. The axial ends 1004, 1006 rotatably retain at a center roller pins 1008, 1010, respectively, which extends outwardly therefrom to connect with the assemblies 10, 500, as will be further described below. As seen in FIG. 3, the roller pins 1008, 1010 are aligned with a rotational axis B of the return roller 1000.

Figure 5:
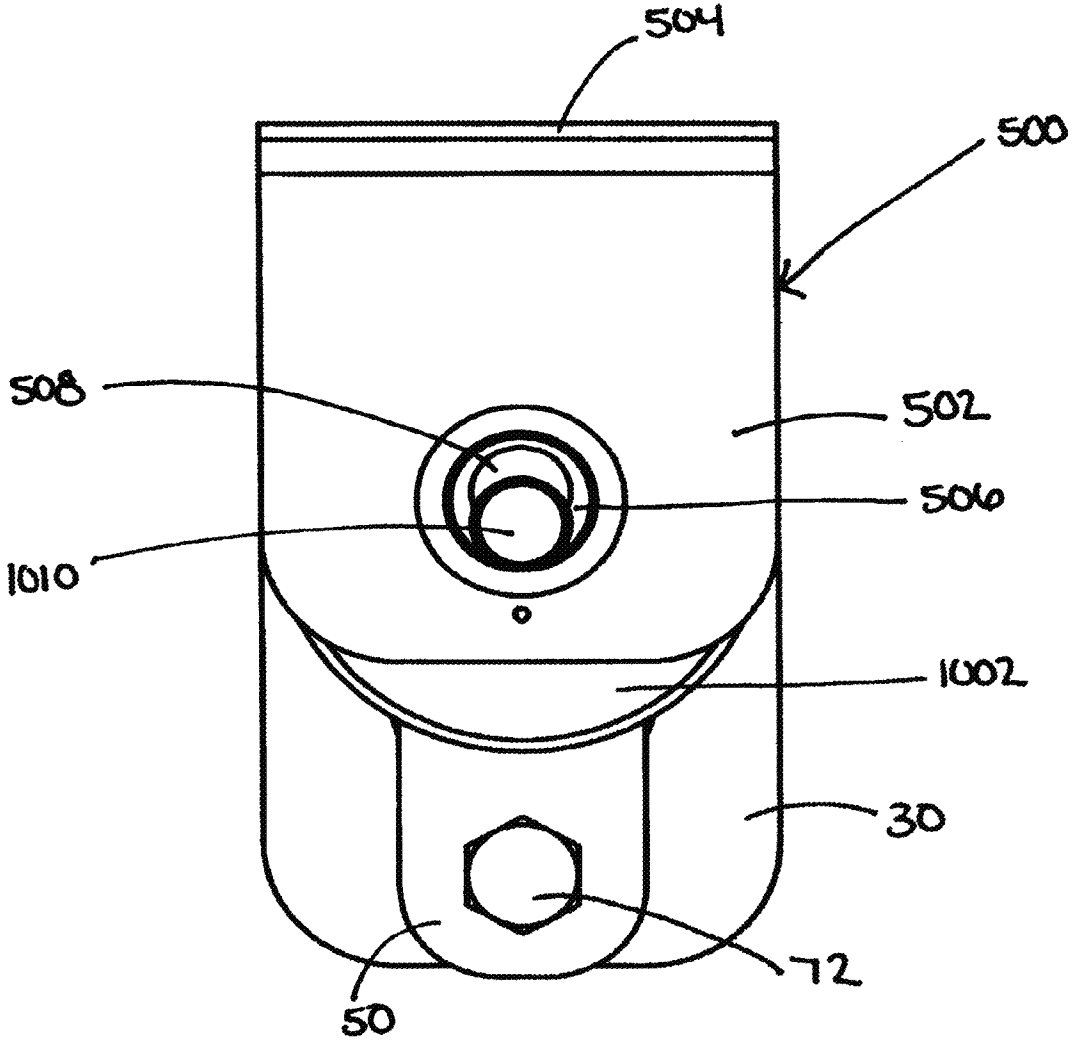
FIG. 5 is a lateral view of the roller bracket assemblies and the return roller shown in FIG. 1 when viewed facing the nonadjustable roller bracket assembly.

Reference is made to FIG. 5, which shows the nonadjustable return roller bracket assembly 500 in the operating position with the return roller 1000 and the adjustable return roller bracket assembly 10. The assembly 500 has a bracket plate 502 and a frame attachment flange 504 integrally formed at a substantially normal orientation to the plate 502, as better seen in FIGS. 1 and 3. As seen in FIGS. 1 and 2, the frame attachment flange 504 defines a pair of opposed open fastener slots 510, 512 sized to receive associated fasteners for attachment to a frame of a belt conveyor system, as will be further described below. Furthermore, as better seen in FIGS. 2 and 3, the bracket plate 502 has a protruding portion 506 of a generally frustoconical or truncated cone shape, which extends inwardly towards the roller 1000, and opposite to the flange 504. The protruding portion 506 defines near a center a pin receiving aperture 508 shaped to receive and retain the roller pin 1010, as will be further described below.

As noted above, the adjustable return roller bracket assembly 10 broadly includes the frame attachment plate 30, the roller engagement plate 50, the coupling bolt 70 and the retention or locking bolt 90. FIG. 8 shows the frame attachment plate 30 in isolation, and includes a main plate portion 32 of generally rectangular shape. The plate 30 also includes a frame attachment flange 34 integrally formed with the portion 32, and extends from an upper edge 35 of the portion 32 (better seen in FIGS. 6 and 7). As seen in FIGS. 1 and 2, the flange 34 defines a pair of opposed open fastener slots 42, 44 to receive associated fasteners for attachment to the frame of the belt conveyor system, as will be further described below. The main plate portion 32 defines a coupling bolt receiving aperture 36, a locking bolt receiving slot 38 and a roller retention flange receiving slot 40. The receiving slot 38 is positioned between the aperture 36 and the slot 40, with the aperture 36 being located proximal to a lower edge 41 of the portion 32 and the slot 40 distal to the lower edge 41.

Figure 9:
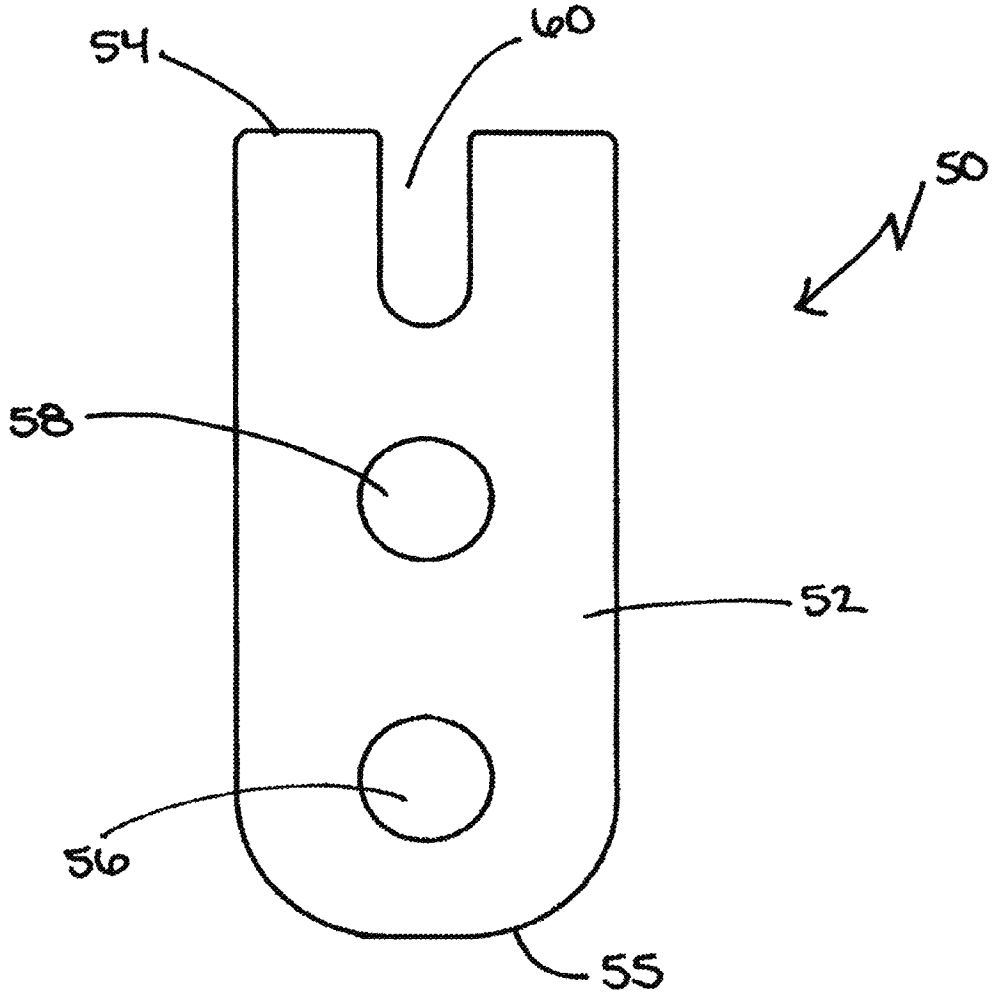
FIG. 9 is a plane view of a roller engagement plate of the adjustable roller bracket assembly shown in FIG. 1.

Reference is made to FIG. 9, which shows the roller engagement plate 50 in isolation. The roller engagement plate 50 is provided with a main plate portion 52 of generally rectangular shape, and defines a coupling bolt receiving aperture 56, a locking bolt receiving aperture 58 and a roller pin retention slot 60. The aperture 56 is located near a lower edge 55 of the main plate portion 52, and the slot 60 near an upper edge 54 of the portion 62, where the slot 60 opens upwardly. The locking bolt receiving aperture 58 is located between the aperture 56 and the slot 60.

Figure 10:
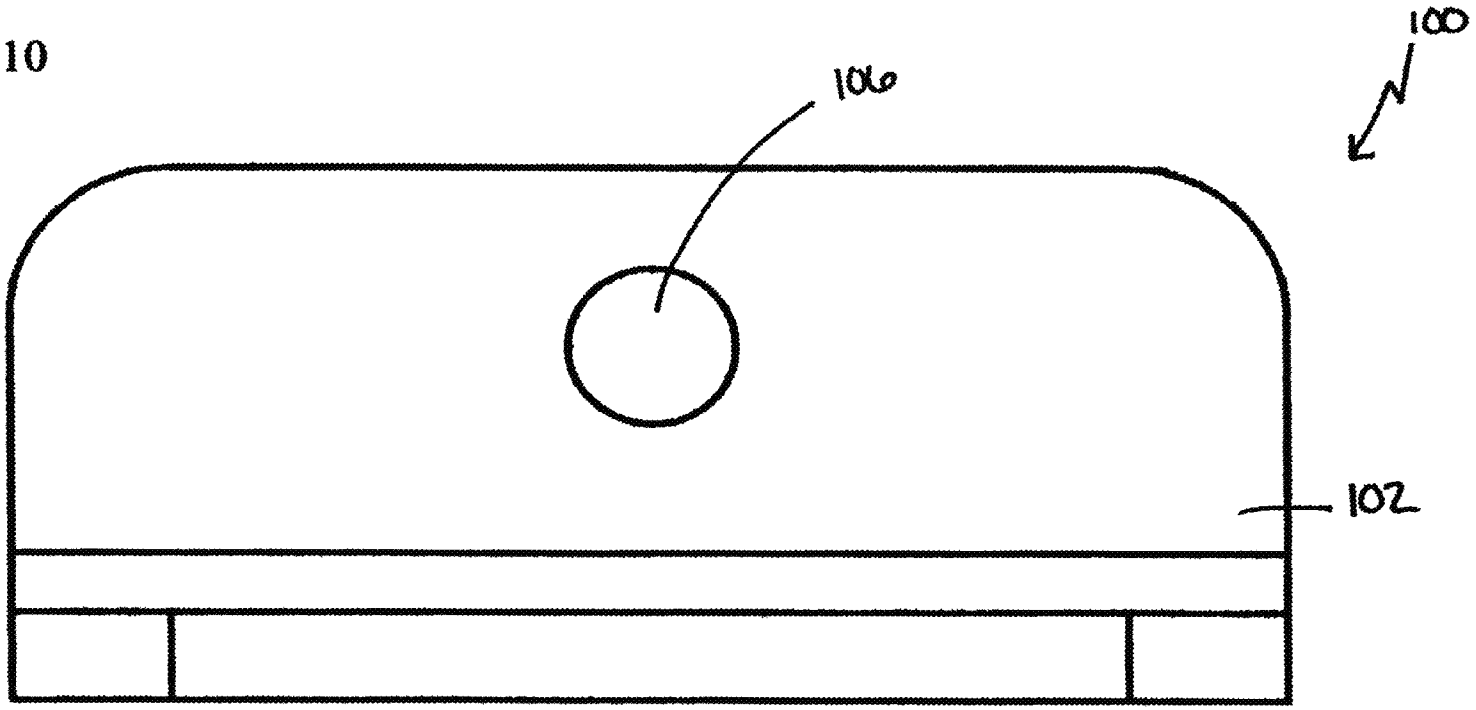
FIG. 10 is a lateral view of a return roller retention flange of the adjustable roller bracket assembly shown in FIG. 1.
Figure 11:
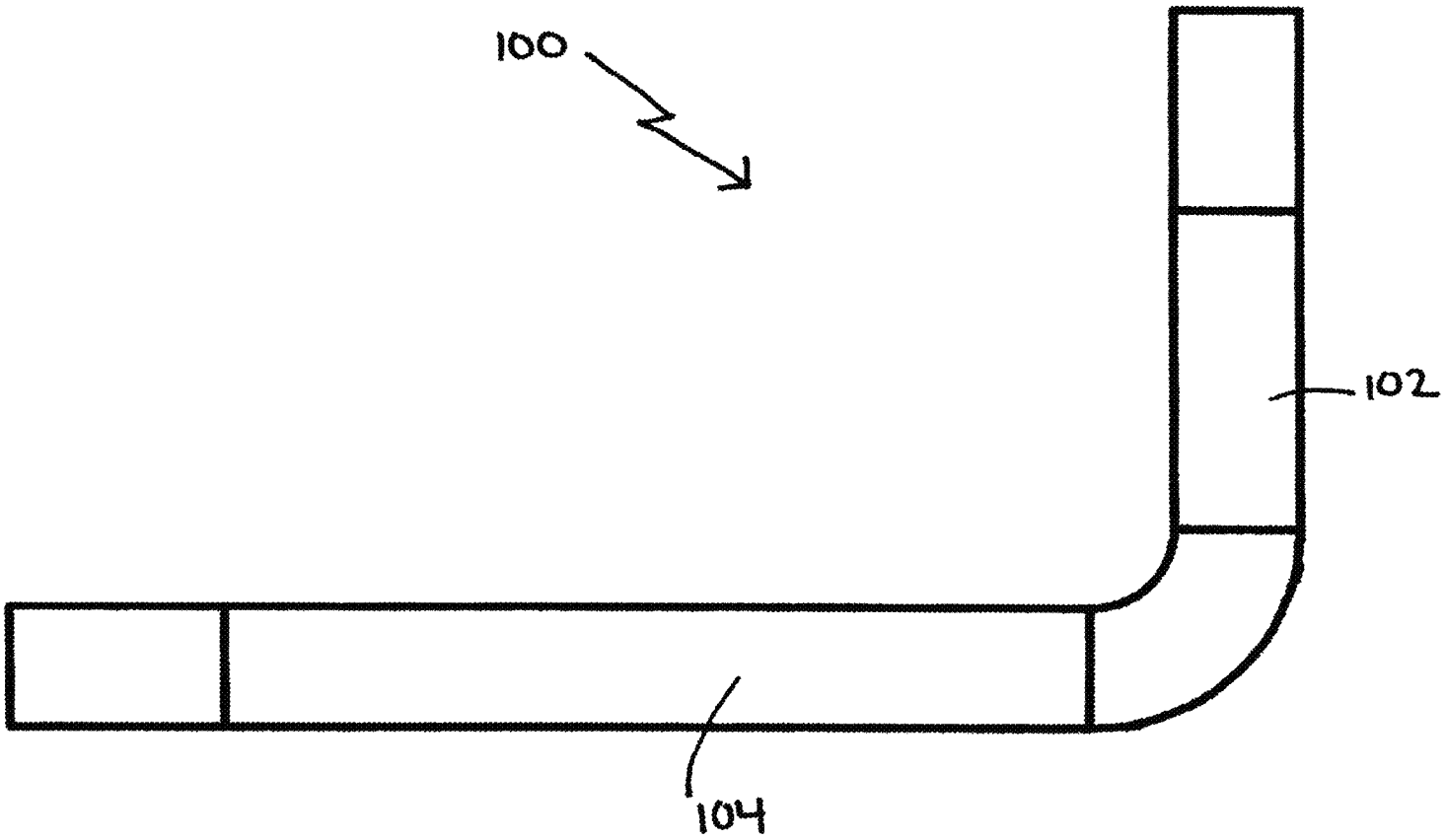
FIG. 11 is a rear view of the return roller retention flange shown in FIG. 10.

Reference is made to FIGS. 10 and 11, which show a return roller retention flange 100 to be coupled to the frame attachment plate 30, as will be further described below. The flange 100 is formed of a generally rectangular plate made into an L-shape, as better seen in FIG. 11, to form first and second flange portions 102, 104. The first flange portion 102 defines around a center thereof a fastener receiving aperture 106 sized to receive a fastener in attaching to the plate 30, as will be further described below.

Figure 6:
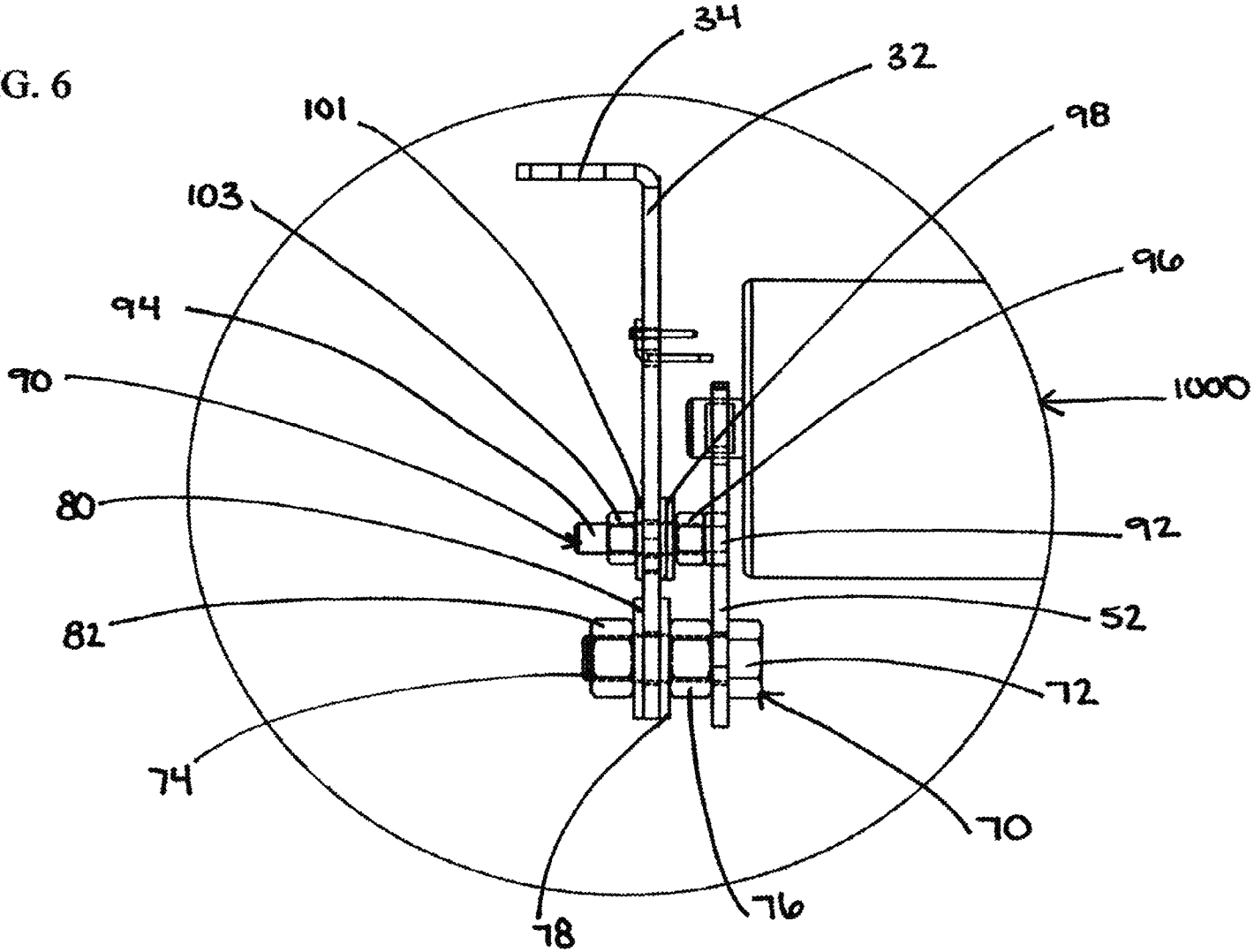
FIG. 6 is a partial enlarged front view of the adjustable roller bracket assembly shown in FIG. 1, where a portion marked with a circle in FIG. 3 is shown.
Figure 7:
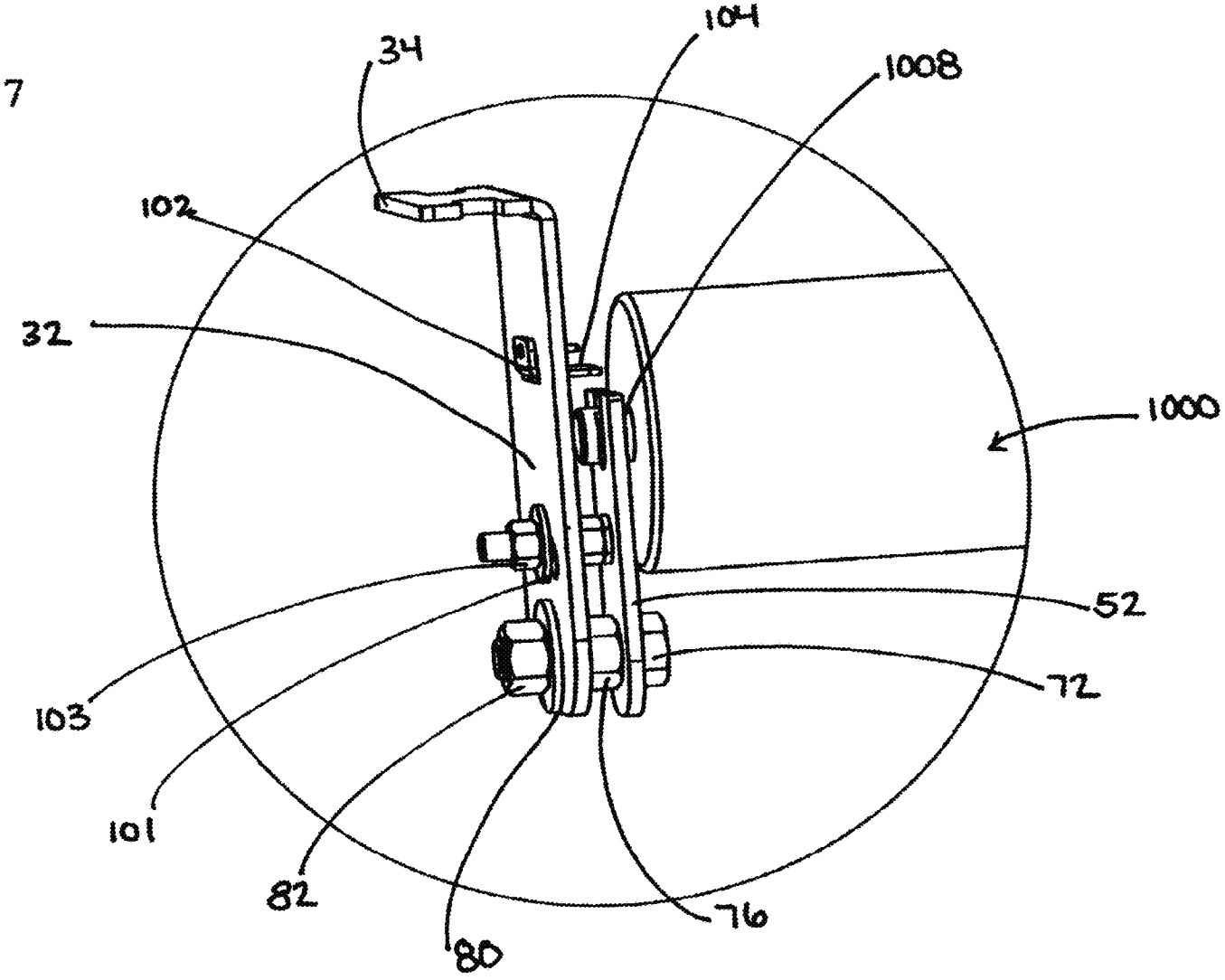
FIG. 7 is a partial enlarged perspective view of the adjustable roller bracket assembly shown in FIG. 1, where a portion marked with a circle in FIG. 3 is shown.
Figure 8:
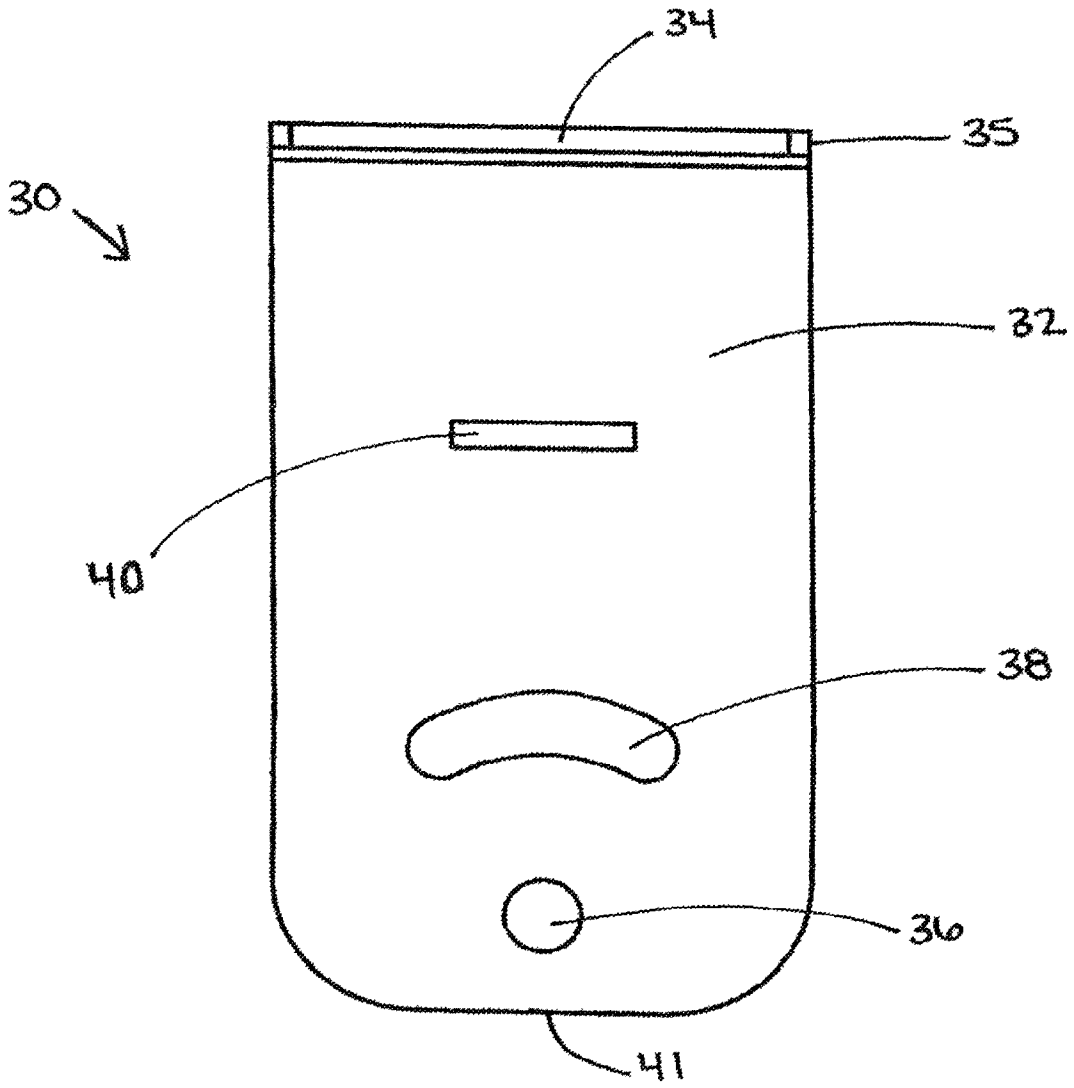
FIG. 8 is a plane view of a frame attachment plate of the adjustable roller bracket assembly shown in FIG. 1.

Reference is made to FIGS. 6 and 7, which show a fully assembled form of the adjustable return roller bracket assembly 10. Specifically, the coupling bolt 70 is inserted through the respective receiving apertures 36, 56 defined by the frame attachment plate 30 and the roller engagement plate 50, such that the planes of the main plate portions 32, 52 are generally parallel to each other. The coupling bolt 70 includes a bolt head 72 and an externally threaded shank portion 74 coupled to the bolt head, and when inserted through the apertures 36, 56, the bolt head 72 contacts the main plate portion 52, as seen in FIGS. 6 and 7. The bolt head 72 is then welded to the main plate portion 52. Interposed between the main plate portions 32, 52 over the shank portion 74 are a first internally threaded nut 76 in complementary threaded engagement with the shank portion 74 and a first washer 78. The first washer 78 contacts the main plate portion 32 of the frame attachment plate 30, and the first nut 76 is adjacent to the main plate portion 52 of the roller engagement plate 50.

Furthermore, a second washer 80 is in contact with the main plate portion 32 opposite to the first washer 78, and a second internally threaded nut 82 is placed over the shank portion 74 in complementary threaded engagement therewith to press again the second washer 80.

To provide frictional resistance against pivoting movement of the roller engagement plate 50 relative to the frame attachment plate 30, the plate 30 is frictionally engaged between the first and second washers 78, 80, which are, in turn, pressed towards the plate 30 by the first and second nuts 76, 82, i.e., by tightening the first and/or second nuts 76, 82 towards the plate 30. The second nut 82, and optionally, the first nut 76, is welded to the shank portion 74.

Similar to the coupling bolt 70, the locking bolt 90 is also provided with a bolt head 92 and an externally threaded shank portion 94. As best seen in FIG. 6, the bolt head 92 is sized to be received in the locking bolt receiving aperture 58, and then welded in place therein, such that the bolt head 92 does not protrude outwardly from a plane of the main plate portion 52 towards the return roller 1000. A third internally threaded nut 96 and third and fourth washers 98 are interposed between the main plate portions 32, 52 over the shank portion 94, with the washers 98 contacting the main plate portion 32 of the frame attachment plate 30, and the third nut 96 is adjacent to the main plate portion 52 of the roller engagement plate 50. Finally, a fifth washer 101 is in contact with the main plate portion 32 opposite to the washers 98, and a locking nut 103 is placed over the shank portion 94 in complementary threaded engagement therewith.

To rotatably engage the return roller 1000 between the bracket assemblies 10, 500, the roller pin 1010 is inserted and retained in the pin receiving aperture 508 defined by the bracket plate 502, and the other roller pin 1008 is likewise inserted and retained in the roller pin retention slot 60 defined by the main plate portion 52. To prevent the possibility of the roller pin 1008 from moving excessively upwardly and out of the slot 60, the second flange portion 104 of the return roller retention flange 100 is inserted through the roller retention flange receiving slot 40 defined by the main plate portion 32, such that the portion 104 extends over the roller pin 1008, as seen in FIG. 7. The flange 100 is held in place to the main plate portion 32 by a fastener inserted through the aperture 106.

To attach the roller bracket assemblies 10, 500 to the belt conveyor system, four fasteners, such as threaded bolts, are inserted through the fastener slots 42, 44, 510, 512 and coupled to a frame of the system located above the assemblies 10, 500. The assemblies 10, 500 are to be positioned such that a conveyor belt of the belt conveyor system (not shown) is disposed above the return roller 1000 in rolling contact therewith, and the rotational axis B of the return roller 1000 is generally normal to the direction of travel of the conveyor belt.

During normal operation, the locking nut 103 is tightened over the shank portion 94 to press against the fifth washer 101 and the frame attachment plate 30 and prevent pivoting movement of the roller engagement plate 50 relative to the plate 30.

When the conveyor belt has moved laterally towards either of the bracket assembly 10, 500, necessitating the tracking of the conveyor belt, the locking nut 103 is first loosened, and then either the bolt head 72 of the coupling bolt 70 or the second nut 82 is rotated against the frictional resistance using a hexagon socket on an extension handle from below the roller 1000 at a safe distance. The bolt head 72 or the second nut 82 may be turned in either direction, depending on how the rotational axis B is to be adjusted relative to the travelling direction of the conveyor belt, in realigning the conveyor belt over the return roller 1000. Alternatively, the roller 1000 or the plate 50 may be "knocked" using, for example, a hammer, to adjust the rotational axis B. Once the conveyor belt is confirmed to be properly realigned by visual inspection, the locking nut 103 is again tightened to prevent movement of the plate 50.

Due to the frictional resistance between the plates 30, 50, the rotational axis B may be adjusted without necessarily requiring cessation of operation of the conveyor belt. To that end, the amount of the frictional resistance may be adjusted beforehand (by adjusting the friction force generated between the first and second nuts 76, 82 by loosening or tightening the nuts), so that the roller engagement plate 50 does not freely move with the conveyor belt when the locking nut 103 is loosened.

While the invention has been described with reference to preferred embodiments, the invention is not or intended by the applicant to be so limited. A person skilled in the art would readily recognize and incorporate various modifications, additional elements and/or different combinations of the described components consistent with the scope of the invention as described herein.

I claim:

1. An adjustable roller bracket assembly for a belt conveyor system, the belt conveyor system comprising a frame, a conveyor belt, a roller in rolling contact with the conveyor belt, and first and second pulleys rotatably coupled to the frame, wherein one or both said first and second pulleys are operable to drive the conveyor belt between and around the pulleys in an endless loop, and the bracket assembly comprising*:* a first end portion[.] *comprising a frame attachment plate;* a second end portion[.] *comprising a roller engagement plate;* and an adjustment mechanism connecting the first and second end portions, the first end portion being for attachment to the frame, the second end portion being for rotatably engaging the roller at an axial end thereof, and the adjustment mechanism being operable to permit selective movement of the second end portion relative to the first end portion against frictional resistance therebetween to effect adjustment of a rotational axis of the roller, wherein the adjustment mechanism comprises*:* a coupling member for movably coupling the first and second end portions, *the coupling member comprising a coupling rod movably connecting or received through said plates to permit pivoting movement of the roller engagement plate relative to the frame attachment plate;* and a locking member operable to selectively permit or prevent the movement of the second end portion relative to the first end portion, *the locking member comprising a locking rod coupled to the roller engagement plate, the frame attachment plate defining a receiving slot shaped to receive the locking rod therethrough along the pivoting movement of the roller engagement plate relative to the frame attachment plate, wherein the locking rod is operable to selectively hold the frame attachment plate relative to the roller engagement plate at a desired position, the locking rod and the receiving slot being located above the coupling rod,* wherein at least one of the coupling member and the locking member provides the frictional resistance between the first and second end portions*; and*

*a roller pin coupled to the roller engagement plate for the rotatable engagement of the roller thereto at the axial end, the roller pin being positioned above the locking rod and the receiving slot.*

2. The assembly of claim 1, wherein in the endless loop, the conveyor belt moves in a conveying direction from the first pulley to the second pulley, around the second pulley, in a return direction to the first pulley, and around the first pulley, wherein the roller is a return roller positioned under the conveyor belt in the rolling contact therewith in the return direction.

[3. The assembly of claim 1, wherein the first end portion comprises a frame attachment plate, the second end portion comprises a roller engagement plate, and the coupling member comprises a coupling rod movably connecting or received through said plates to permit pivoting movement of the roller engagement plate relative to the frame attachment plate.]

[4. The assembly of claim 3, wherein the locking member comprises a locking rod coupled to the roller engagement plate, and the frame attachment plate defines a receiving slot shaped to receive the locking rod therethrough along the pivoting movement of the roller engagement plate relative to the frame attachment plate, wherein the locking rod is operable to selectively hold the frame attachment plate relative to the roller engagement plate at a desired position.]

5. The assembly of claim [4] *1*, wherein the locking rod comprises an externally threaded portion and a locking nut having an internally threaded portion for complementary threaded engagement with the externally threaded portion, wherein the locking nut is selectively movable in the threaded engagement to press against the frame attachment plate around a periphery of the receiving slot, thereby providing at least a portion of the frictional resistance between said two plates during the pivoting movement of the roller engagement plate relative to the frame attachment plate or preventing the pivoting movement at the desired position.

[6. The assembly of claim 5, wherein the frame attachment plate comprises a sloping portion around the periphery of the receiving slot with an increasing slope height from a slot center to each longitudinal end of the receiving slot, thereby providing an increasing amount of the frictional resistance against the pivoting movement of the roller engagement plate relative to the frame attachment plate through the locking nut, with the locking rod and the locking nut moving towards the longitudinal end.]

[7. The assembly of claim 4, wherein the locking rod and the receiving slot are located above the coupling rod.]

[8. The assembly of claim 7, wherein the assembly further comprises a roller pin coupled to the roller engagement plate for the rotatable engagement of the roller thereto at the axial end, the roller pin being positioned above the locking rod and the receiving slot.]

9. The assembly of claim [3] *1*, wherein the coupling rod is fixedly attached to the roller engagement plate and received through the frame attachment plate, the coupling rod comprising an externally threaded portion and a pair of holding nuts each having an internally threaded portion [tor] *for* complementary threaded engagement with the externally threaded portion of the coupling rod, wherein the frame attachment plate is frictionally held between the holding nuts, thereby providing at least a portion of the frictional resistance between said two plates.

10. The assembly of claim 9, wherein the adjustment mechanism further comprises a pair of washers, each said washer being disposed between the frame attachment plate and an associated one of the holding nuts, whereby the washers are in frictional engagement with the frame attachment plate to provide at least a portion of the frictional resistance between the frame attachment plate and the roller engagement plate[, and optionally, wherein the holding nuts are welded to the externally threaded portion of the coupling rod].

11. The assembly of claim [3] *1*, wherein the coupling rod is fixedly attached to the roller engagement plate, and the frame attachment plate comprises a receiving barrel oriented substantially normal to a plane of the frame attachment plate, wherein the coupling rod is received through the receiving barrel in an interference fit, thereby providing at least a portion of the frictional resistance between said two plates.

12. A belt conveyor system comprising a frame, a conveyor belt, a roller in rolling contact with the conveyor belt, and first and second pulleys rotatably coupled to the frame, wherein one or both said first and second pulleys are operable to drive the conveyor belt between and around the pulleys in an endless loop, whereby the conveyor belt moves in a conveying direction from the first pulley to the second pulley, around the second pulley, in a return direction to the first pulley, and around the first pulley, the roller being a return roller positioned under the conveyor belt in rolling contact therewith in the return direction, wherein the system further comprises an adjustable roller bracket assembly comprising*:* a first end portion[,] *comprising a frame attachment plate;* a second end portion[,] *comprising a roller engagement plate*; and an adjustment mechanism connecting the first and second end portions, the first end portion being for attachment to the frame, the second end portion being for rotatably engaging the return roller at an axial end thereof, and the adjustment mechanism being operable to permit selective movement of the second end portion relative to the first end portion [against frictional resistance therebetween] to effect adjustment of a rotational axis of the roller, and wherein the adjustment mechanism comprises*:* a coupling member for movably coupling the first and second end portions, [and] *the coupling member comprising a coupling rod movably connecting or received through said plates to permit pivoting movement of the roller engagement plate relative to the frame attachment plate;* a locking member operable to selectively permit or prevent [the] movement of the second end portion relative to the first end portion[, wherein at least one of the coupling member and the locking member provides the frictional resistance between the first and second end portions], *the locking member comprising a locking rod coupled to the roller engagement plate, and the frame attachment plate defining a receiving slot shaped to receive the locking rod therethrough along the pivoting movement of the roller engagement plate relative to the frame attachment plate, wherein the locking rod is operable to selectively hold the frame attachment plate relative to the roller engagement plate at a desired position, the locking rod and the receiving slot being positioned above the coupling rod; and*

*a roller pin coupled to the roller engagement plate for the rotatable engagement of the return roller thereto at the axial end, the roller pin being positioned above the locking rod and the receiving slot.*

[13. The system of claim 12, wherein the first end portion comprises a frame attachment plate, the second end portion comprises a roller engagement plate, and the coupling member comprises a coupling rod movably connecting or received through said plates to permit pivoting movement of the roller engagement plate relative to the frame attachment plate.]

[14. The system of claim 13, wherein the locking member comprises a locking rod coupled to the roller engagement plate, and the frame attachment plate defines a receiving slot shaped to receive the locking rod therethrough along the pivoting movement of the roller engagement plate relative to the frame attachment plate, wherein the locking rod is operable to selectively hold the frame attachment plate relative to the roller engagement plate at a desired position.]

15. The system of claim 12, wherein the locking rod comprises an externally threaded portion and a locking nut having an internally threaded portion for complementary threaded engagement with the externally threaded portion, wherein the locking nut is selectively movable in the threaded engagement to press against the frame attachment plate around a periphery of the receiving slot, thereby [providing at least a portion of the frictional resistance between said two plates during the] *limiting or preventing* pivoting movement of the roller engagement plate relative to the frame attachment plate[or preventing the pivoting movement at the desired position].

[16. The system of claim 15, wherein the frame attachment plate comprises a sloping portion around the periphery of the receiving slot with an increasing slope height from a slot center to each longitudinal end of the receiving slot, thereby providing an increasing amount of the frictional resistance against the pivoting movement of the roller engagement plate relative to the frame attachment plate through the locking nut, with the locking rod and the locking nut moving towards the longitudinal end.]

[17. The system of claim 14, wherein the locking rod and the receiving slot are positioned above the coupling rod.]

[18. The system of claim 17, wherein the assembly further comprises a roller pin coupled to the roller engagement plate for the rotatable engagement of the return roller thereto at the axial end, the roller pin being positioned above the locking rod and the receiving slot.]

19. The system of claim [13] *12*, wherein the coupling rod is fixedly attached to the roller engagement plate and received through the frame attachment plate, the coupling rod comprising an externally threaded portion and a pair of holding nuts each having an internally threaded portion for complementary threaded engagement with the externally threaded portion of the coupling rod, wherein the frame attachment plate is [frictionally] held between the holding nuts[, thereby providing at least a portion of the frictional resistance between said two plates].

20. The system of claim 19, wherein the adjustment mechanism further comprises a pair of washers, each said washer being disposed between the frame attachment plate and an associated one of the holding nuts[, whereby the washers are in frictional engagement with the frame attachment plate to provide at least a portion of the frictional resistance between the frame attachment plate and the roller engagement plate, and optionally, wherein] the holding nuts [are] *being* welded to the externally threaded portion of the coupling rod.

21. The system of claim [13] *12*, wherein the coupling rod is fixedly attached to the roller engagement plate, and the frame attachment plate comprises a receiving barrel oriented substantially normal to a plane of the frame attachment plate, wherein the coupling rod is received through the receiving barrel in an interference fit[, thereby providing at least a portion of the frictional resistance between said two plates].

*22. An adjustable roller bracket assembly for a belt conveyor system, the belt conveyor system comprising a frame, a conveyor belt, a roller in rolling contact with the conveyor belt, and first and second pulleys rotatably coupled to the frame, wherein one or both said first and second pulleys are operable to drive the conveyor belt between and around the pulleys in an endless loop, the bracket assembly comprising:*

*a first end portion for attachment to the frame, the first end portion comprising a frame attachment plate;*

*a second end portion for rotatably engaging the roller at an axial end thereof, the second end portion comprising a roller engagement plate; and*

*an adjustment mechanism connecting the first and second end portions, the adjustment mechanism being operable to permit selective movement of the second end portion relative to the first end portion to effect adjustment of a rotational axis of the roller, the adjustment mechanism comprising:*

*a coupling member for movably coupling the first and second end portions, the coupling member comprising a coupling rod movably connecting or received through said plates to permit pivoting movement of the roller engagement plate relative to the frame attachment plate, the coupling rod being fixedly attached to the roller engagement plate and received through the frame attachment plate, the coupling rod comprising an externally threaded portion and a pair of holding nuts each having an internally threaded portion for complementary threaded engagement with the externally threaded portion of the coupling rod, wherein the frame attachment plate is held between the holding nuts; and*

*a locking member operable to selectively permit or prevent the movement of the second end portion relative to the first end portion.*

*23. The assembly of claim 22, wherein the locking member comprises a locking rod coupled to the roller engagement plate, and the frame attachment plate defines a receiving slot shaped to receive the locking rod therethrough along the pivoting movement of the roller engagement plate relative to the frame attachment plate, wherein the locking rod is operable to selectively hold the frame attachment plate relative to the roller engagement plate at a desired position.*

*24. The assembly of claim 23, wherein the locking rod comprises an externally threaded portion and a locking nut having an internally threaded portion for complementary threaded engagement with the externally threaded portion, wherein the locking nut is selectively movable in the threaded engagement to press against the frame attachment plate around a periphery of the receiving slot, thereby limiting or preventing pivoting movement of the roller engagement plate relative to the frame attachment plate.*

*25. The assembly of claim 22, wherein the adjustment mechanism further comprises a pair of washers, wherein each washer is disposed between the frame attachment plate and a respective holding nut, the holding nuts being connected to the externally threaded portion of the coupling rod.*

*26. An adjustable roller bracket assembly for a belt conveyor system, the bracket assembly comprising:*

*a frame attachment plate;*

*a roller engagement plate; and*

*an adjustment assembly connecting the roller engagement plate to the frame attachment plate and operable to selectively permit relative movement thereof, the adjustment assembly comprising:*

*a coupling assembly configured to movably connect the roller engagement plate to the frame attachment plate, the coupling assembly comprising a coupling bolt receivable through the roller engagement plate and frame attachment plate to selectively permit or prevent pivoting movement of the roller engagement plate relative to the frame attachment plate, the coupling bolt comprising an externally threaded portion and being fixedly attached to the roller engagement plate and received through the frame attachment plate, wherein the coupling assembly further comprises a pair of holding nuts each having an internally threaded portion for complementary threaded engagement with the externally threaded portion of the coupling bolt, and wherein the frame attachment plate is held between the holding nuts; and*

*a locking assembly configured to selectively permit or prevent rotation of the roller engagement plate relative to the frame attachment plate.*

*27. The assembly of claim 26, wherein the locking assembly comprises a locking bolt operable to couple the frame attachment plate relative to the roller engagement plate at a selected position, and wherein the frame attachment plate defines a receiving slot shaped to receive the locking bolt therethrough and permit pivoting movement of the roller engagement plate relative to the frame attachment plate.*

*28. The assembly of claim 27, wherein the locking bolt comprises an externally threaded portion, and wherein the locking assembly further comprises a locking nut having an internally threaded portion for complementary threaded engagement with the externally threaded portion of the locking bolt, wherein the locking nut is selectively positionable to contact the frame attachment plate around a periphery of the receiving slot, thereby limiting or preventing pivoting movement of the roller engagement plate relative to the frame attachment plate.*

*29. The assembly of claim 26, wherein the adjustment assembly further comprises a pair of washers, wherein each washer is disposed between the frame attachment plate and a respective holding nut.*

* * * * *